United States Patent
Kawamata et al.

(10) Patent No.: US 9,987,979 B2
(45) Date of Patent: Jun. 5, 2018

(54) VEHICLE LIGHTING SYSTEM

(71) Applicant: TOYOTA JIDOSHA KABUSHIKI KAISHA, Toyota-shi, Aichi-ken (JP)

(72) Inventors: Shinya Kawamata, Mishima (JP); Shinichi Nagata, Yokohama (JP); Kazuyuki Fujita, Gotenba (JP); Minami Sato, Ebina (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/444,988

(22) Filed: Feb. 28, 2017

(65) Prior Publication Data

US 2017/0253177 A1 Sep. 7, 2017

(30) Foreign Application Priority Data

Mar. 7, 2016 (JP) .................. 2016-043543

(51) Int. Cl.
| | |
|---|---|
| *G08G 1/00* | (2006.01) |
| *B60Q 1/52* | (2006.01) |
| *B60Q 1/06* | (2006.01) |
| *B60Q 1/24* | (2006.01) |
| *B60K 35/00* | (2006.01) |
| *B60Q 9/00* | (2006.01) |
| *G08G 1/16* | (2006.01) |

(52) U.S. Cl.
CPC .............. *B60Q 1/525* (2013.01); *B60K 35/00* (2013.01); *B60Q 1/06* (2013.01); *B60Q 1/24* (2013.01); *B60Q 9/008* (2013.01); *G08G 1/161* (2013.01); *G08G 1/166* (2013.01); *B60K 2350/1084* (2013.01); *B60K 2350/2052* (2013.01); *B60K 2350/924* (2013.01); *B60Q 2400/50* (2013.01)

(58) Field of Classification Search
CPC ...................................... B06Q 1/525
USPC .......................................... 340/901
See application file for complete search history.

(56) References Cited

U.S. PATENT DOCUMENTS

| | | | | |
|---|---|---|---|---|
| 6,733,134 | B2* | 5/2004 | Bleiner .............. | B60Q 1/52 116/28 R |
| 7,175,321 | B1* | 2/2007 | Lopez ............... | B60Q 1/50 296/21 |
| 9,221,509 | B2* | 12/2015 | Lai .................. | B62J 6/001 |
| 9,481,287 | B2* | 11/2016 | Marti ............... | B60Q 1/00 |

(Continued)

FOREIGN PATENT DOCUMENTS

| | | |
|---|---|---|
| JP | 2008-143510 A | 6/2008 |
| JP | 2009-282564 A | 12/2009 |

*Primary Examiner* — Santiago Garcia
(74) *Attorney, Agent, or Firm* — Sughrue Mion, PLLC

(57) ABSTRACT

A vehicle lighting system includes a first detection unit that detects a moving body around a host vehicle, a first determination unit that determines whether the moving body is a target to which an alert should be sent, a projection unit that can project a first pattern, which indicates first information on the host vehicle, in a predetermined range around the target, a second determination unit that determines whether another vehicle is projecting a second pattern, which indicates second information on the other vehicle, and a control unit that controls the projection unit such that the first pattern is projected at the predetermined range around the target and the first pattern does not overlap with the second pattern or such that the first pattern is not projected, when the other vehicle is projecting the second pattern.

9 Claims, 12 Drawing Sheets

(56) References Cited

U.S. PATENT DOCUMENTS

| | | | |
|---|---|---|---|
| 2007/0053195 A1* | 3/2007 | Alberti | B60Q 1/2665 362/494 |
| 2008/0036576 A1* | 2/2008 | Stein | B60R 1/00 340/425.5 |
| 2008/0175012 A1 | 7/2008 | Shimaoka et al. | |
| 2009/0013922 A1* | 1/2009 | Lin | B60Q 1/38 116/28 R |
| 2010/0253539 A1* | 10/2010 | Seder | G01S 13/723 340/903 |
| 2010/0253541 A1* | 10/2010 | Seder | G01S 13/723 340/905 |
| 2010/0253594 A1* | 10/2010 | Szczerba | G01S 13/723 345/7 |
| 2010/0289632 A1* | 11/2010 | Seder | G01S 13/723 340/436 |
| 2010/0292886 A1* | 11/2010 | Szczerba | G01C 21/365 701/31.4 |
| 2012/0194356 A1* | 8/2012 | Haines | G08G 1/161 340/933 |
| 2013/0154815 A1* | 6/2013 | Min | B60Q 1/085 340/425.5 |
| 2016/0207443 A1* | 7/2016 | Widdowson | B60Q 1/0011 |
| 2016/0291149 A1* | 10/2016 | Zeng | G01S 13/931 |
| 2016/0321924 A1* | 11/2016 | Lewis | G08G 1/096791 |
| 2016/0330417 A1* | 11/2016 | Lin | G02B 26/105 |
| 2017/0190334 A1* | 7/2017 | Zelman | B60W 40/09 |
| 2017/0190336 A1* | 7/2017 | Vijayan | B60Q 1/525 |

* cited by examiner

VEHICLE LIGHTING SYSTEM

INCORPORATION BY REFERENCE

The disclosure of Japanese Patent Application No. 2016-043543 filed on Mar. 7, 2016 including the specification, drawings and abstract is incorporated herein by reference in its entirety.

BACKGROUND

1. Technical Field

The present disclosure relates to the technical field of a vehicle lighting system that presents information to a target by projecting light around a host vehicle.

2. Description of Related Art

As a system of this type, a technology is known that presents some information (for example, the information indicating that the host vehicle is approaching) to a target around the host vehicle by projecting light toward the target. Japanese Patent Application Publication No. 2008-143510 (JP 2008-143510 A) proposes a technology that detects a target around a vehicle and alerts the target by projecting the projection light of a predetermined pattern toward that target. Japanese Patent Application Publication No. 2009-282564 (JP 2009-282564 A) proposes a technology that expands the projection range of the headlight further forward than usual when it is determined that a vehicle is likely to collide with a pedestrian.

SUMMARY

According to the technology proposed in Japanese Patent Application Publication No. 2008-143510 (JP 2008-143510 A) described above, there is a possibility that, when there is a plurality of vehicles equipped with a similar system, a plurality of projection lights is projected toward the same target. More specifically, there may be a situation in which the host vehicle projects an alert pattern to a target and, at the same time, another vehicle projects an alert pattern to that same target.

In such a case, when the projection positions of projection light sometimes overlap with each other, the shape of the pattern is lost and, as a result, there is a possibility that a target cannot recognize the pattern, indicated by the projection light, or recognizes the pattern as another pattern indicating incorrect information. Therefore, this technology has a technical problem that an appropriate alert cannot be sent to a target due to a projection light from another vehicle.

The present disclosure provides a vehicle lighting system that can present information appropriately to a target even when there is a plurality of vehicles capable of presenting information to the target by a projection light.

A vehicle lighting system in an aspect of the present disclosure includes a first detection unit configured to detect a moving body around a host vehicle, a first determination unit configured to determine whether the moving body is a target to which an alert should be sent, a projection unit capable of projecting a first pattern, which indicates first information on the host vehicle, in a predetermined range around the target when the first determination unit determines that the moving body is the target, a second determination unit configured to determine whether another vehicle is projecting a second pattern, which indicates second information on the other vehicle, in the predetermined range around the target, and a control unit configured to control the projection unit such that the first pattern is projected at a position where the predetermined range around the target and the first pattern does not overlap with the second pattern or such that the first pattern is not projected, when the second determination unit determines that the other vehicle is projecting the second pattern.

According to the vehicle lighting system of the present disclosure, either the first pattern projected from the host vehicle is projected at a position where the predetermined range around the target and the first pattern does not overlap with the second pattern or the first pattern is not projected, when the other vehicle is projecting the second pattern. Therefore, the vehicle lighting system of the present disclosure reduces the possibility that overlapping between the first pattern, projected by the host vehicle, and the second pattern, projected by the other vehicle, prevents appropriate information from being presented to the target.

In the aspect described above, the control unit may be configured to control the projection unit such that the first pattern is projected at the predetermined range around the target when the second determination unit determines that the other vehicle is not projecting the second pattern.

According to this configuration, the first information on the host vehicle can be presented to the target.

In the aspect described above, the vehicle lighting system may further include a difference calculation unit configured to calculate difference information that is included in the first information but is not included in the second information. The projection unit can project a third pattern, which indicates the difference information, in addition to the first pattern, and the control unit may be configured to control the projection unit such that, instead of the first pattern, the third pattern is projected at the predetermined range around the target and the third pattern does not overlap with the second pattern, when the second determination unit determines that the other vehicle is projecting the second pattern.

According to this configuration, the difference information can be presented to the target without interfering with the projection of the second pattern.

In the aspect described above, each of the first information and the second information has information indicating priority, and the vehicle lighting system may further include a third determination unit that determines the priority of the first information and the second information. The control unit may be configured to control the projection unit such that a request is sent to the other vehicle to stop the projection of the second pattern and, after that, the first pattern is projected, when the second determination unit determines that the other vehicle is projecting the second pattern and that the third determination unit determines that the priority of the first information is higher than the priority of the second information.

According to this configuration, higher priority information can be presented to the target.

In the aspect described above, the projection unit can project the second pattern and a fourth pattern, which indicates both the first information and the second information, in addition to the first pattern, and the control unit may be configured to control the projection unit such that the second pattern or the fourth pattern is projected instead of the first pattern, when the second determination unit determines that the other vehicle is not projecting the second pattern.

According to this configuration, the second information on the other vehicle can be presented from the host vehicle by projecting the second pattern or the fourth pattern.

In the aspect described above, the first determination unit may be configured to determine whether the moving body is the target, based on contact possibility between the host vehicle and the moving body or peripheral visibility of the moving body.

According to this configuration, it is possible to appropriately determine whether the moving body is the target to which an alert should be sent.

In the aspect described above, the first determination unit may be configured to determine whether the moving body is the target, based on contact possibility between the other vehicle and the moving body or the peripheral visibility of the moving body.

In the aspect described above, the second determination unit may be configured to determine whether the other vehicle is projecting the second pattern based on an analysis result of captured image data.

The operation and effect of the present disclosure will become apparent from the embodiments described below.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of a vehicle lighting system of the present disclosure are described below with reference to the drawings. In the description below, the two embodiments, first embodiment and second embodiment, are described.

First Embodiment

A vehicle lighting system in the first embodiment is described with reference to FIG. 1 to FIG. 6. In the description below, the configuration of the vehicle lighting system, the problems that may be generated when using a projection pattern, the operation of the vehicle lighting system, and the technical effects achieved by the vehicle lighting system are described sequentially.

Figure 1:
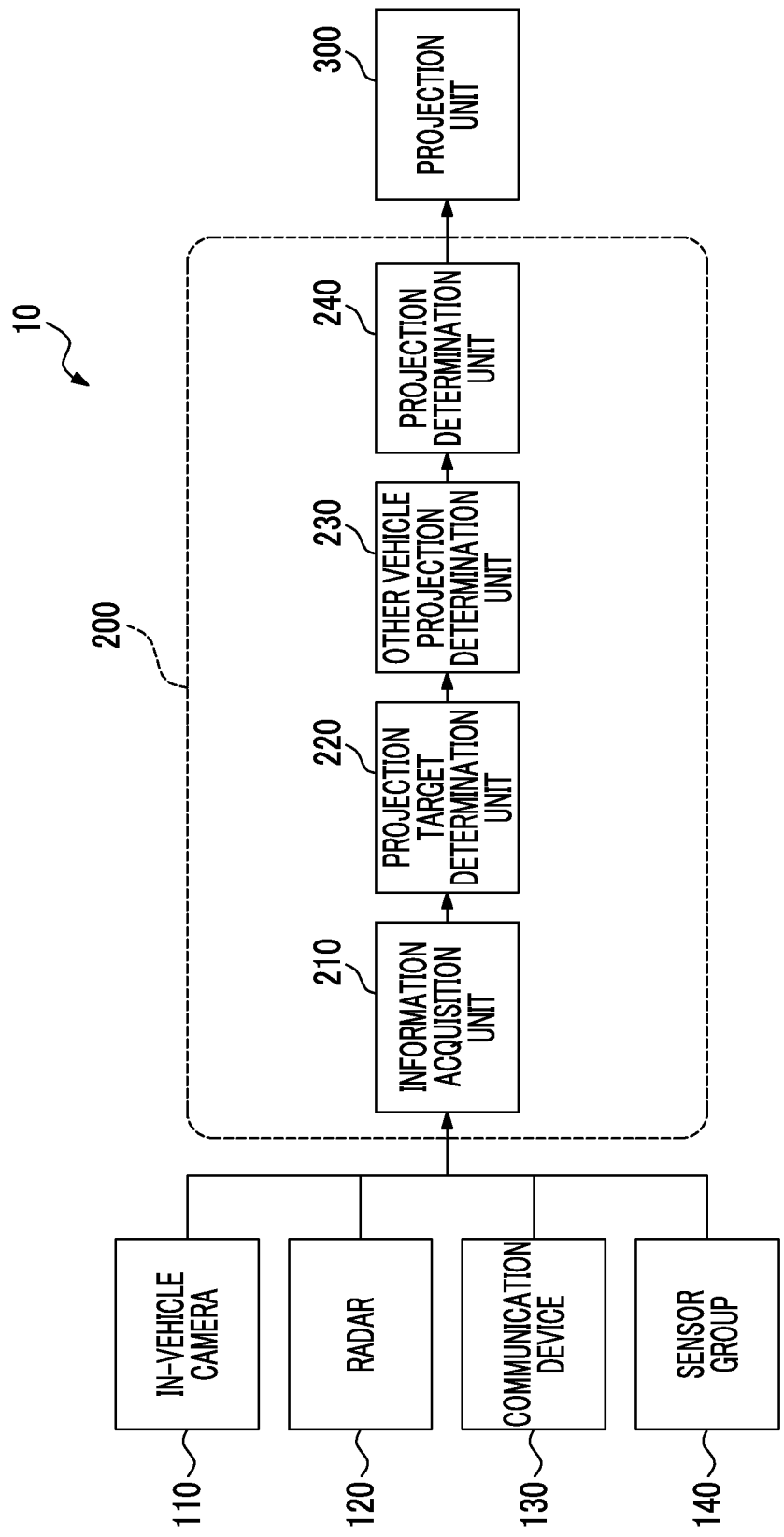
FIG. 1 is a block diagram showing a configuration of a vehicle lighting system in a first embodiment.

First, the configuration of the vehicle lighting system in the first embodiment is described with reference to FIG. 1. FIG. 1 is a block diagram showing the configuration of the vehicle lighting system in the first embodiment.

In FIG. 1, a vehicle lighting system 10 in the first embodiment, mounted on a vehicle such as an automobile, is configured to be able to project a predetermined projection pattern on the road surface by projecting light. The vehicle lighting system 10 includes an in-vehicle camera 110, a radar 120, a communication device 130, a sensor group 140, an electronic control unit (ECU) 200, and a projection unit 300.

The in-vehicle camera 110 is a camera capable of capturing the area ahead of the vehicle (in other words, the area corresponding to the field of view of the driver). The in-vehicle camera 110 may be a camera that captures an image using visible light or a camera that captures images using non-visible light (for example, infrared light). An image captured by the in-vehicle camera 110 is output to an information acquisition unit 210 as image data.

The radar 120 is a radar capable of recognizing an object that is present in the area ahead of the vehicle. The radar 120 is configured to be able to detect the position and the moving speed of an object around the vehicle by using millimeter waves or a laser. The information on an object detected by the radar 120 is output to the information acquisition unit 210.

The communication device 130 is configured to be able to receive information on the surrounding environment of the vehicle by radio communication. More specifically, the communication device 130 carries out vehicle-vehicle communication, road-vehicle communication, or pedestrian-vehicle communication to receive information on the other vehicles and pedestrians. The communication device 130 may also be configured to be able to send information on the host vehicle. The information received by the communication device 130 is output to the information acquisition unit 210.

The sensor group 140 includes a plurality of sensors capable of detecting the status of the host vehicle. For example, the sensor group 140 includes a vehicle speed sensor, an acceleration sensor, a yaw sensor, and the like. The information indicating the status of the host vehicle, detected by the sensor group 140, is output to the information acquisition unit 210.

The ECU 200, a controller unit having an arithmetic circuit such as a central processing unit (CPU), is configured to be able to control various operations in the vehicle. In particular, the ECU 200 in this embodiment is configured to be able to perform control for drawing a projection pattern that will be described later. The ECU 200 includes the following units as logical or physical processing blocks that are realized therein: the information acquisition unit 210, a projection target determination unit 220, an other vehicle projection determination unit 230, and a projection determination unit 240.

The information acquisition unit 210 is configured to be able to acquire the information, output from each of the in-vehicle camera 110, the radar 120, and the communication device 130, as the surrounding environment information (that is, the information indicating the surrounding environment of the vehicle, in particular, the information on the objects around the vehicle). The surrounding environment information acquired by the information acquisition unit 210 is output to the projection target determination unit 220. The information acquisition unit 210, together with the in-vehicle camera 110, the radar 120, and the communication device 130, functions as a specific example of the "detection unit (detection means)".

In addition, the information acquisition unit 210 is configured to be able to acquire the information, output from the sensor group 140, as host vehicle information (that is, the information indicating the status of the host vehicle). The host vehicle information, acquired by the information acquisition unit 210, is output to the projection target determination unit 220 together with the surrounding environment information.

The projection target determination unit 220 is configured to be able to detect moving bodies, which are present around the vehicle, using the surrounding environment information received from the information acquisition unit 210. The "moving body" mentioned here means not only an object that is actually moving but also an object that is likely to move. For example, pedestrians who are stopped and other vehicles that are stopped may be detected as moving bodies.

In addition, the projection target determination unit 220 is configured to be able to determine whether the detected moving body is a target. The "target" mentioned here is a target to which an alert should be sent using a projection pattern. For example, a pedestrian who is crossing in front of the host vehicle on the road, on which the host vehicle is traveling, is a target. The information on the target determined by the projection target determination unit 220 (for example, information indicating the attribute and the position of the target, the movement direction, the movement speed, etc.) is output to the other vehicle projection determination unit 230. The projection target determination unit 220 is a specific example of the "first determination unit (first determination means)".

The other vehicle projection determination unit 230 is configured to be able to determine whether the other vehicle is projecting a projection pattern to the target determined by the projection target determination unit 220. More specifically, the other vehicle projection determination unit 230 determines whether the other vehicle is projecting a projection pattern, based on the analysis result of the image data captured by the in-vehicle camera 110 or based on the vehicle-vehicle communication carried out by the communication device 130. In addition, the other vehicle projection determination unit 230 may be configured to be able to determine not only whether the other vehicle is projecting a projection pattern but also what type of information the projected projection pattern presents. The determination result of the other vehicle projection determination unit 230 is output to the projection determination unit 240. The other vehicle projection determination unit 230 is a specific example of the "second determination unit (second determination means)".

The projection determination unit 240 is configured to be able to determine whether to project a projection pattern from the host vehicle, based on the determination result of the other vehicle projection determination unit 230. In addition, the projection determination unit 240 may be configured to be able to determine not only whether to project a projection pattern from the host vehicle but also the specific projection mode of the projection pattern. The specific determination processing performed by the projection determination unit 240 is described in detail in the description of the operation that will be given later. The determination result of the projection determination unit 240 is output to the projection unit 300. The projection determination unit 240 is a specific example of the "control unit (control means)".

The projection unit 300 includes a light (for example, the headlight of the vehicle) capable of changing the direction, and the pattern, of light to be projected. The projection unit 300 is configured to be able to project a predetermined projection pattern in a predetermined range around a target based on the determination result of the projection determination unit 240. The "predetermined range" mentioned here is the range in which a projection pattern, drawn on the road surface by the light from the projection unit 300, is clear enough to be recognized by the target. That is, the "predetermined range" is the range in which the target can visually recognize the predetermined projection pattern. The projection unit 300 may have a function to change the projection position to an appropriate position according to the movement of the host vehicle or the target. The projection unit 300 is a specific example of the "projection unit (projection means)".

Figure 2:
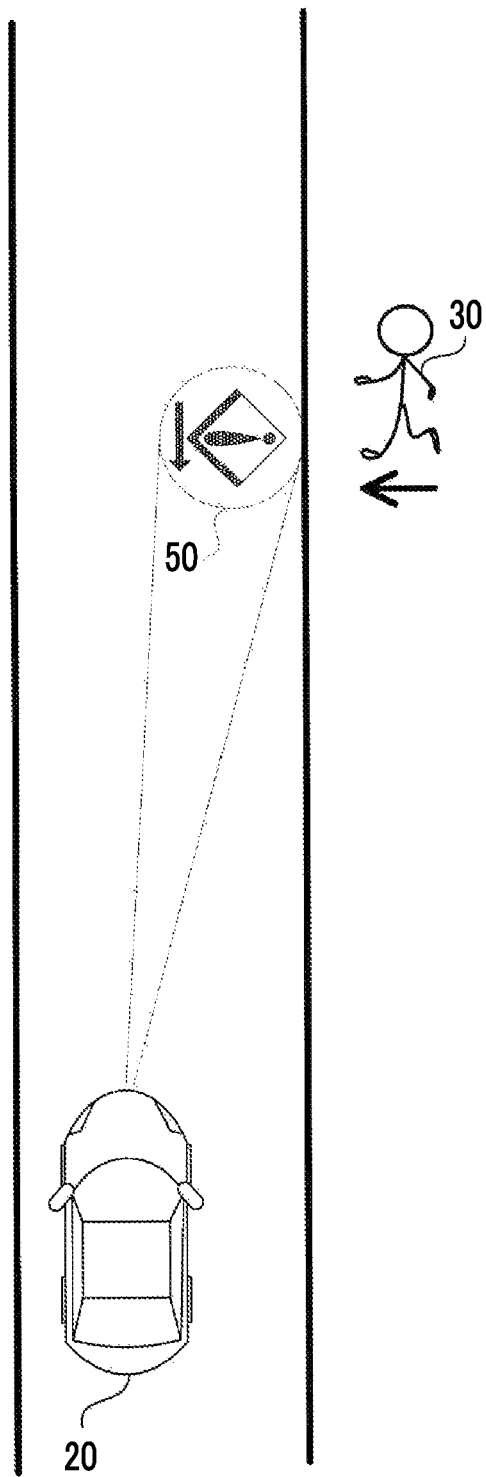
FIG. 2 is a top view showing an example in which a host vehicle projects a projection pattern toward a pedestrian.
Figure 3:
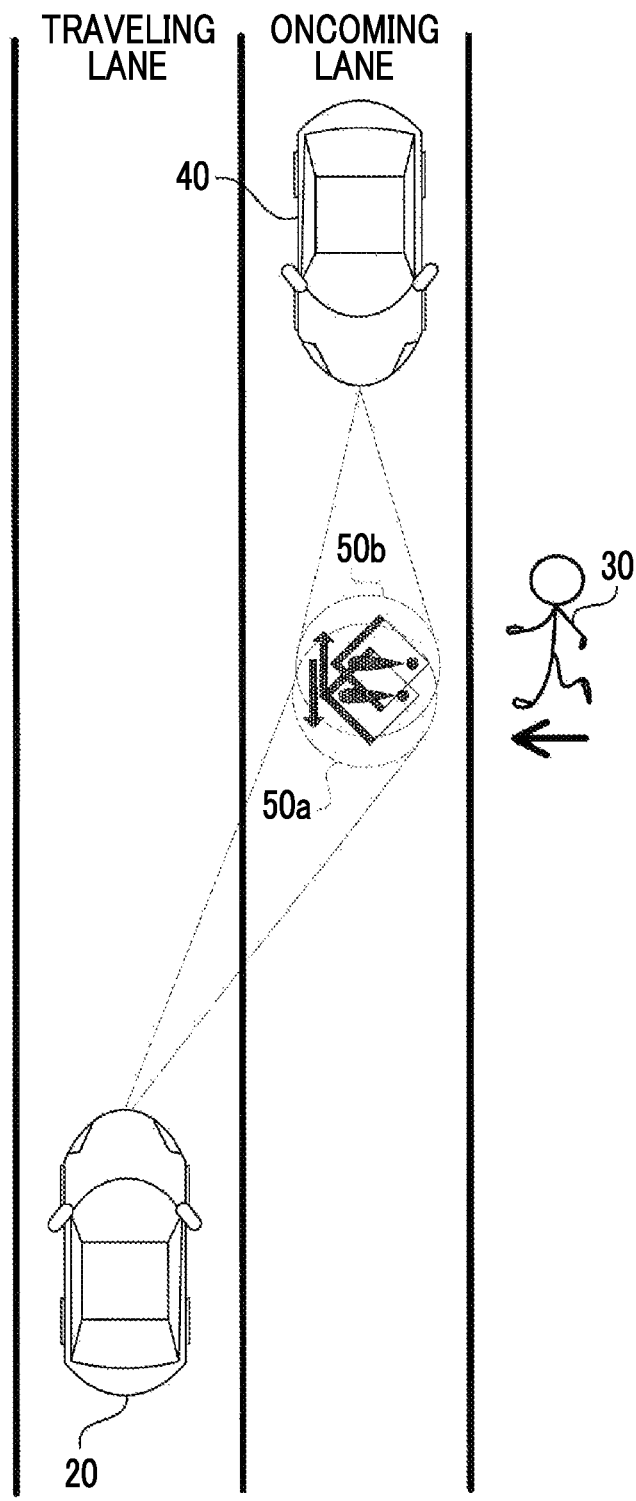
FIG. 3 is a top view showing a reference example in which the host vehicle and another vehicle project projection patterns toward the same pedestrian.

Next, the problem that may be generated when using a projection pattern is described in detail with reference to FIG. 2 and FIG. 3. FIG. 2 is a top view showing an example in which the host vehicle projects a projection pattern toward a pedestrian. FIG. 3 is a top view showing a reference example in which the host vehicle and the other vehicle project projection patterns toward the same pedestrian.

In the example shown in FIG. 2, there is a pedestrian 30 who is going to cross the roadway in front of a host vehicle 20. If this pedestrian 30 continues to cross the roadway, the host vehicle 20 and the pedestrian 30 may approach and collide. In such a case, the vehicle lighting system 10 in this embodiment projects light toward the area in front of the pedestrian 30 to draw a projection pattern 50 for alerting the pedestrian 30.

The projection pattern 50 is projected, for example, as a figure including the "exclamation mark" and the "arrow" as shown in the figure. The exclamation mark is generally recognized as a mark meaning "caution" or "danger." For this reason, the pedestrian 30 who views the projection pattern 50 is expected to pay attention to the direction indicated by the arrow. Using the projection pattern 50 in this way makes it possible to appropriately alert the pedestrian 30 (i.e., target) that the host vehicle 20 is approaching.

In the reference example in FIG. 3, there is the pedestrian 30 who is going to cross the roadway and another vehicle 40 that is traveling in the oncoming lane. In this case, if the other vehicle 40 has the vehicle lighting system 10 similar to that of the host vehicle 20, it is assumed that the other vehicle 40 also projects the projection pattern 50*b* to alert the pedestrian 30.

However, if a projection pattern 50*a* projected by the host vehicle 20 and a projection pattern 50*b* projected by the other vehicle 40 overlap, the projection pattern 50*a* and the projection pattern 50*b* may form a shape that is difficult to recognize or cannot be recognized. In such a case, it becomes difficult to appropriately alert the pedestrian 30. In addition, the overlapping between the projection pattern 50*a* and the projection pattern 50*b* may result in forming a pattern that is recognized as a pattern for presenting incorrect information to the pedestrian 30. For example, the resulting pattern may be recognized as a pattern for prompting the pedestrian to approach the projection pattern 50. In this case, the resulting pattern may increase danger to the pedestrian 30 rather than alert the pedestrian 30.

As described above, when there is a plurality of vehicles capable of projecting the projection pattern 50, a plurality of projection patterns 50 is projected toward the same target, sometimes resulting in a situation in which it is impossible to appropriately alert the target. To avoid such a situation, the vehicle lighting system 10 in this embodiment performs the operation that is described in detail below.

Figure 4:
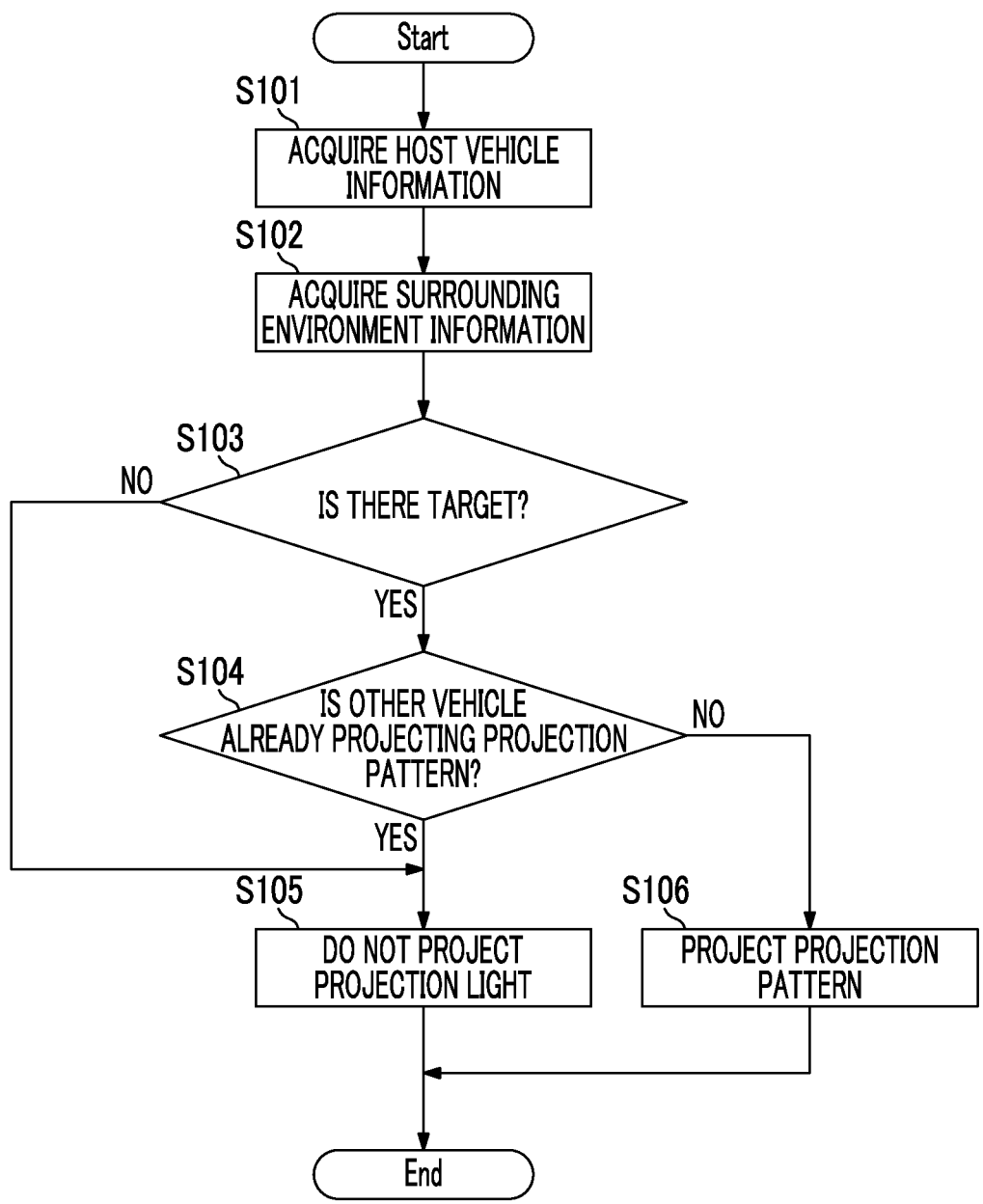
FIG. 4 is a flowchart showing the flow of the operation of the vehicle lighting system in the first embodiment.

The operation of the vehicle lighting system 10 in the first embodiment is described in detail below with reference to FIG. 4. FIG. 4 is a flowchart showing the flow of the operation of the vehicle lighting system in the first embodiment.

In FIG. 4, when the vehicle lighting system 10 in this embodiment starts operation, the information acquisition unit 210 first acquires the host vehicle information detected by the sensor group 140 (step S101). Next, the information acquisition unit 210 acquires the surrounding environment information detected by the in-vehicle camera 110, the radar 120, and the communication device 130 (step S102). The processing in step S101 and step S102 may be performed in reverse order or concurrently. The host vehicle information and the surrounding environment information, acquired by the information acquisition unit 210, are output to the projection target determination unit 220.

Next, the projection target determination unit 220 determines whether there is a target, to which an alert should be sent, around the host vehicle 20 (step S103). From the surrounding environment information, the projection target determination unit 220 detects a moving body that is likely to be a target and, based on the host vehicle information and the surrounding environment information, determines whether the detected moving body is a target. The target determined in this step includes not only a moving body to which an alert should be sent in relation to the host vehicle 20 but also a moving body to which an alert should be sent in relation to the other vehicle 40. That is, if an alert should not be sent from the host vehicle 20, but should be sent from the other vehicle 40, to a moving body, the moving body is determined as a target.

Whether or not the moving body is a target is determined using contact possibility or peripheral visibility calculated, for example, from the surrounding environment information. "Contact possibility" is a value indicating the possibility that the host vehicle 20 will contact the moving body or the possibility that the other vehicle 40 will contact the moving body. For example, the contact possibility is calculated based on the distance or the relative speed between the host vehicle 20 or the other vehicle 40 and the moving body. "Peripheral visibility" is a value indicating the visibility around the moving body as viewed from the driver of the host vehicle 20 or the other vehicle 40 or the visibility in the direction of the host vehicle 20 or the other vehicle 40 as viewed from the moving body. For example, the peripheral visibility is calculated based on the ambient brightness and whether or not there is an obstacle that reduces the visibility.

Figure 5:
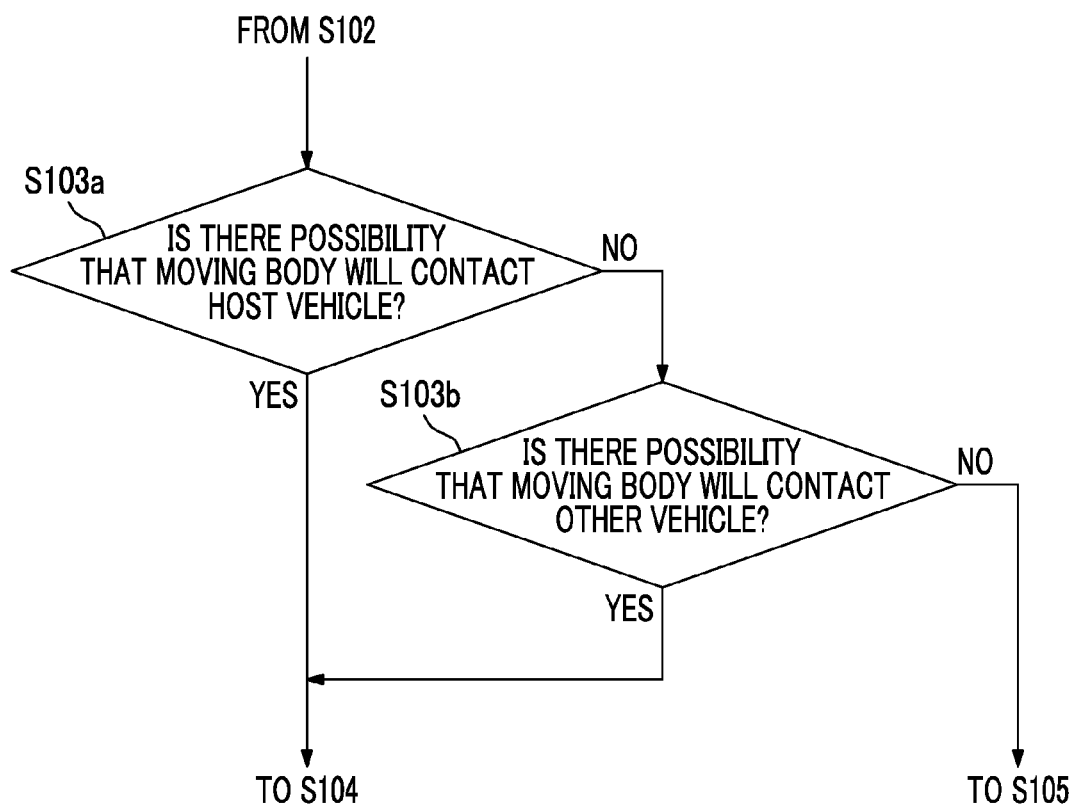
FIG. 5 is a flowchart showing a target determination method using contact possibility.
Figure 6:
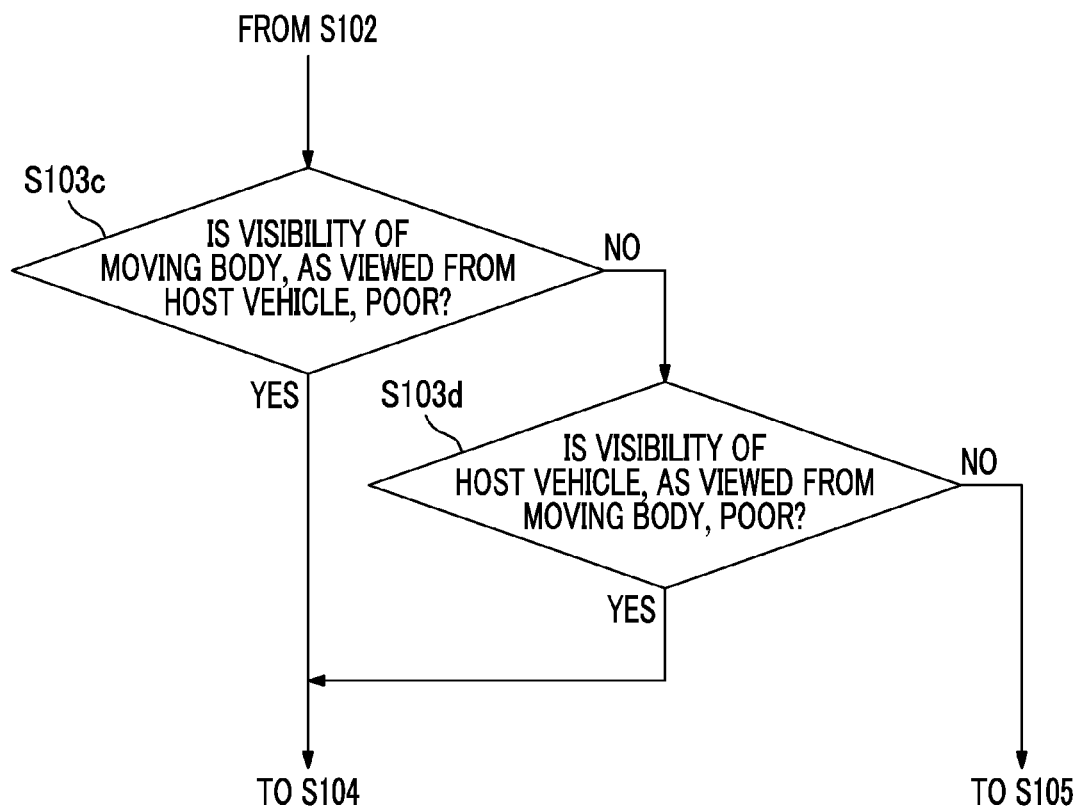
FIG. 6 is a flowchart showing a target determination method using peripheral visibility.

The target determination flow using contact possibility and peripheral visibility is described in detail below with reference to FIG. 5 and FIG. 6. FIG. 5 is a flowchart showing a target determination method using contact possibility. FIG. 6 is a flowchart showing a target determination method using peripheral visibility. The processing shown in FIG. 5 and FIG. 6 is the processing performed in step S103 shown in FIG. 4.

A target is determined using contact possibility as shown in FIG. 5. First, it is determined whether there is a possibility that the moving body will contact the host vehicle 20 (step S103a). More specifically, the contact possibility between the moving body and the host vehicle 20 is calculated based on the distance and the relative speed between the moving body and the host vehicle 20. Then, the calculated contact possibility is compared with the predetermined first threshold to determine whether there is a possibility that the moving body and the host vehicle 20 will contact with each other. When it is determined that there is a possibility that the moving body and the host vehicle 20 will contact (step S103a: YES), then it is determined that the moving body is a target and the processing proceeds to step S104.

On the other hand, when it is determined that there is no possibility that the moving body will contact the host vehicle 20 (step S103a: NO), then it is determined whether there is a possibility that the moving body will contact the other vehicle 40 (step S103b). More specifically, the contact possibility between the moving body and the other vehicle 40 is calculated based on the distance and the relative speed between the moving body and the other vehicle 40. Then, the calculated contact possibility is compared with the predetermined second threshold to determine whether there is a possibility that the moving body and the other vehicle 40 will contact with each other. When it is determined that there is a possibility that the moving body and the other vehicle 40 will contact (step S103b: YES), then it is determined that the moving body is a target and the processing proceeds to step S104. On the other hand, when it is determined that there is no possibility that the moving body and the other vehicle 40 will contact (step S103b: NO), then it is determined that the moving body is not a target and the processing proceeds to step S105.

To determine whether the moving body is a target using peripheral visibility, it is first determined, as shown in FIG. 6, whether the visibility of the moving body as viewed from the host vehicle 20 is poor (step S103c). More specifically, the peripheral visibility around the moving body as viewed from the host vehicle 20 is calculated based on the brightness, and on whether or not there is an obstacle, around the moving body. After that, the calculated peripheral visibility is compared with the predetermined third threshold to determine whether the peripheral visibility of the moving body as viewed from the host vehicle 20 is poor. When it is determined that the peripheral visibility of the moving body as viewed from the host vehicle 20 is poor (step S103c: YES), then it is determined that the moving body is a target and the processing proceeds to step S104.

On the other hand, when it is determined that the visibility of the moving body as viewed from the host vehicle 20 is not poor (step S103c: NO), then it is determined whether the visibility of the host vehicle 20 as viewed from the moving body is poor (step S103d). More specifically, the peripheral visibility around the host vehicle 20 as viewed from the moving body is calculated based on the brightness, and on whether or not there is an obstacle, around the host vehicle 20. After that, the calculated peripheral visibility is compared with the predetermined fourth threshold to determine whether the visibility of the host vehicle 20 as viewed from the moving body is poor. When it is determined that the visibility of the host vehicle 20 as viewed from the moving body is poor (step S103d: YES), then it is determined that the moving body is a target and the processing proceeds to step S104. On the other hand, when it is determined that the visibility of the host vehicle 20 as viewed from the moving body is not poor (step S103d: NO), then it is determined that the moving body is not a target and the processing proceeds to step S105.

In addition to, or instead of, the peripheral visibility of the moving body as viewed from the host vehicle 20 and the peripheral visibility of the host vehicle 20 as viewed from the moving body, the peripheral visibility of the moving body as viewed from the other vehicle 40 and the peripheral visibility of the other vehicle 40 as viewed from the moving body may be determined. In addition, the peripheral visibility as well as the driving operation of the driver of the host vehicle 20 may be detected to determine whether the driver of the host vehicle 20 has recognized that there is the moving body. Similarly, the peripheral visibility as well as the movement of the moving body may be detected to determine whether the moving body has recognized that there is the host vehicle 20.

Returning to FIG. 4, when the projection target determination unit 220 determines that the moving body is not a target (that is, an alert should not be sent) (step S103: NO), the host vehicle 20 does not project a projection light (step S105) and a series of processing is terminated. That is, the host vehicle 20 does not project an alert using the projection pattern 50.

On the other hand, when the projection target determination unit 220 determines that the moving body is a target (that is, an alert should be sent) (step S103: YES), the other vehicle projection determination unit 230 determines whether the other vehicle 40 is already projecting the projection pattern 50 toward the target (step S104). The projection pattern 50 projected by the other vehicle 40 is a specific example of the "second pattern".

When it is determined that the other vehicle 40 is already projecting the projection pattern 50 toward the target (step S104: YES), the projection determination unit 240 determines that the projection pattern 50 should not be projected from the host vehicle 20 toward the target. Therefore, if the other vehicle 40 is already projecting the projection pattern 50, the host vehicle 20 does not project the projection pattern 50 (step S105).

On the other hand, when it is determined that the other vehicle 40 is not projecting the projection pattern 50 toward the target (step S104: NO), the projection determination unit 240 determines that the projection pattern 50 should be projected from the host vehicle 20 toward the target. Therefore, if the other vehicle is not projecting the projection pattern 50, the projection pattern 50 is projected from the host vehicle 20 toward the target (step S106). The projection pattern 50 projected by the host vehicle 20 is a specific example of the "first pattern".

Next, the technical effect achieved by the vehicle lighting system 10 in the first embodiment is described below.

As described with reference to FIG. 1 to FIG. 6, when there is a target (i.e., the pedestrian 30 or the like) around the host vehicle 20 to which an alert should be sent, the vehicle lighting system 10 in the first embodiment determines whether to project the projection pattern 50 from the host vehicle 20 depending upon whether or not the projection pattern 50 is being projected from the other vehicle 40.

Therefore, when the other vehicle 40 is already projecting the projection pattern 50, the projection pattern 50 is not projected from the host vehicle 20. In other words, when the other vehicle 40 is already projecting the projection pattern 50, an alert is sent only by the projection pattern 50b projected by the other vehicle 40. Projecting the projection pattern 50 in this way avoids a situation in which overlapping between the projection pattern 50a, projected from the host vehicle 20, and the projection pattern 50b, projected from the other vehicle 40, makes it impossible to send an appropriate alert to the target.

On the other hand, when the other vehicle 40 is not projecting the projection pattern 50 to the target, the projection pattern 50 is projected from the host vehicle 20. In other words, when the other vehicle 40 is not projecting the projection pattern 50, an alert is sent only by the projection pattern 50a projected by the host vehicle 20. Projecting the projection pattern 50 in this way also avoids a situation in which overlapping between the projection pattern 50a, projected from the host vehicle 20, and the projection pattern 50b, projected from the other vehicle 40, makes it impossible to send an appropriate alert to the target.

Second Embodiment

Next, a vehicle lighting system in a second embodiment is described with reference to FIG. 7 to FIG. 12. The second embodiment has a configuration almost similar to that of the first embodiment already described above except only a part of the operation. Therefore, in the description below, only the part different from the first embodiment is described in detail and the duplicate description of the overlapping part is omitted as appropriate.

In the following, the description of the configuration of the vehicle lighting system is omitted, and the operation of the vehicle lighting system and the technical effect achieved by the vehicle lighting system are described sequentially.

Figure 7:
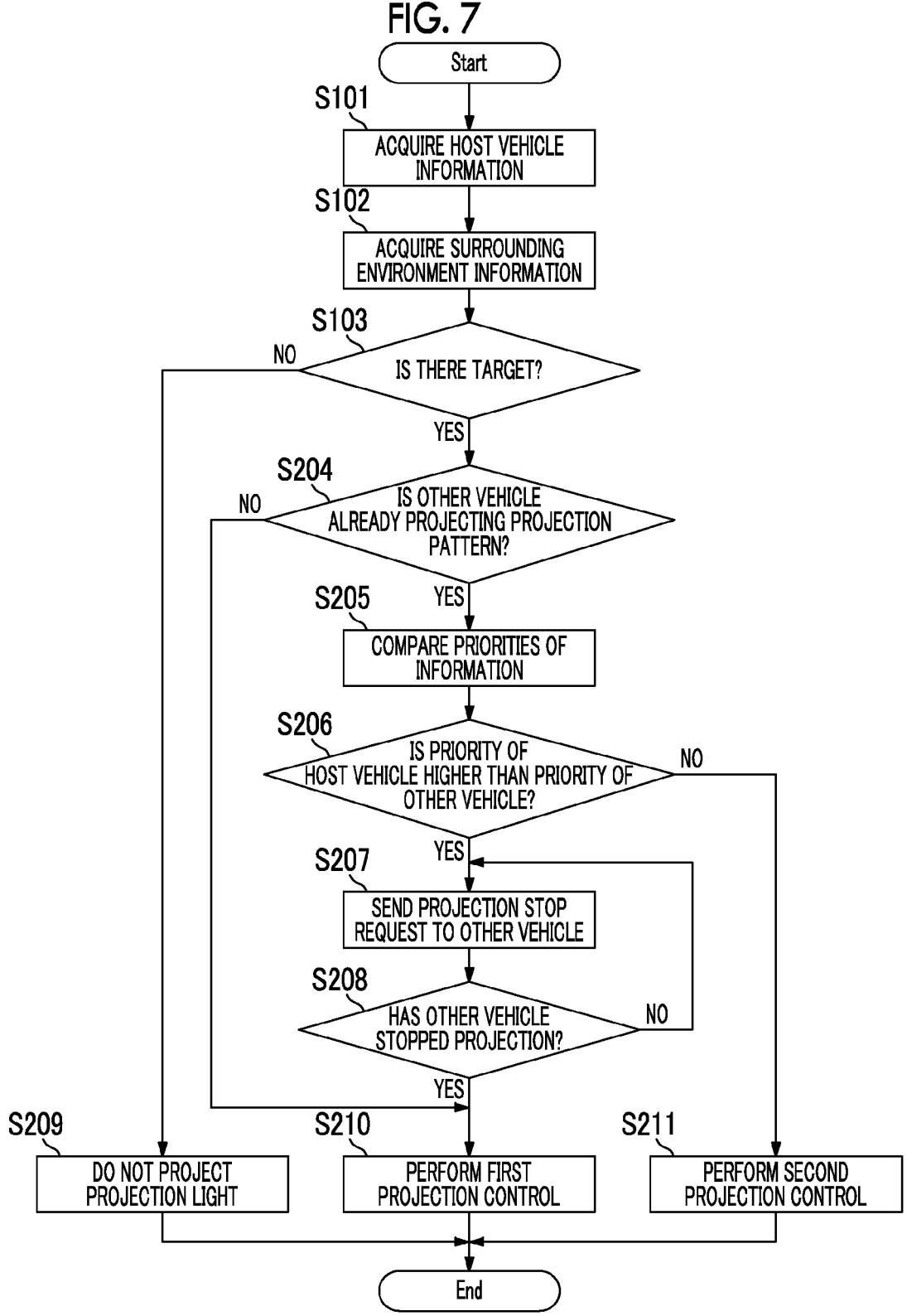
FIG. 7 is a flowchart showing the flow of the operation of a vehicle lighting system in a second embodiment.

The operation of the vehicle lighting system 10 in the second embodiment is described in detail with reference to FIG. 7. FIG. 7 is a flowchart showing the flow of the operation of the vehicle lighting system in the second embodiment. In FIG. 7, the same reference numeral is given to the same processing as that of the first embodiment described above (see FIG. 4), and the description thereof is omitted as appropriate.

In FIG. 7, when the vehicle lighting system 10 in the second embodiment starts operation, the same processing as that in steps S101 to S103 in the first embodiment is performed first. That is, the information acquisition unit 210 acquires the host vehicle information (step S101). Next, the information acquisition unit 210 acquires the surrounding environment information (step S102). After that, the projection target determination unit 220 determines whether there is a target, to which an alert should be sent, around the host vehicle 20 (step S103). When it is determined that there is no target, to which an alert should be sent, around the host vehicle 20 (step S103: NO), the host vehicle 20 does not project a projection light (step S209), and a series of processing is terminated. That is, the host vehicle 20 does not send an alert using the projection pattern 50.

On the other hand, when it is determined that there is a target (step S103: YES), the other vehicle projection determination unit 230 determines whether the other vehicle 40 is already projecting the projection pattern toward the target (step S204). When it is determined that the other vehicle 40 is not projecting the projection pattern (step S204: NO), the projection determination unit 240 performs the first projection control (step S210). The first projection control is a control operation performed when the other vehicle 40 is not projecting the projection pattern 50 (in other words, a control operation performed when only the host vehicle 20 projects the projection pattern 50).

Figure 8:
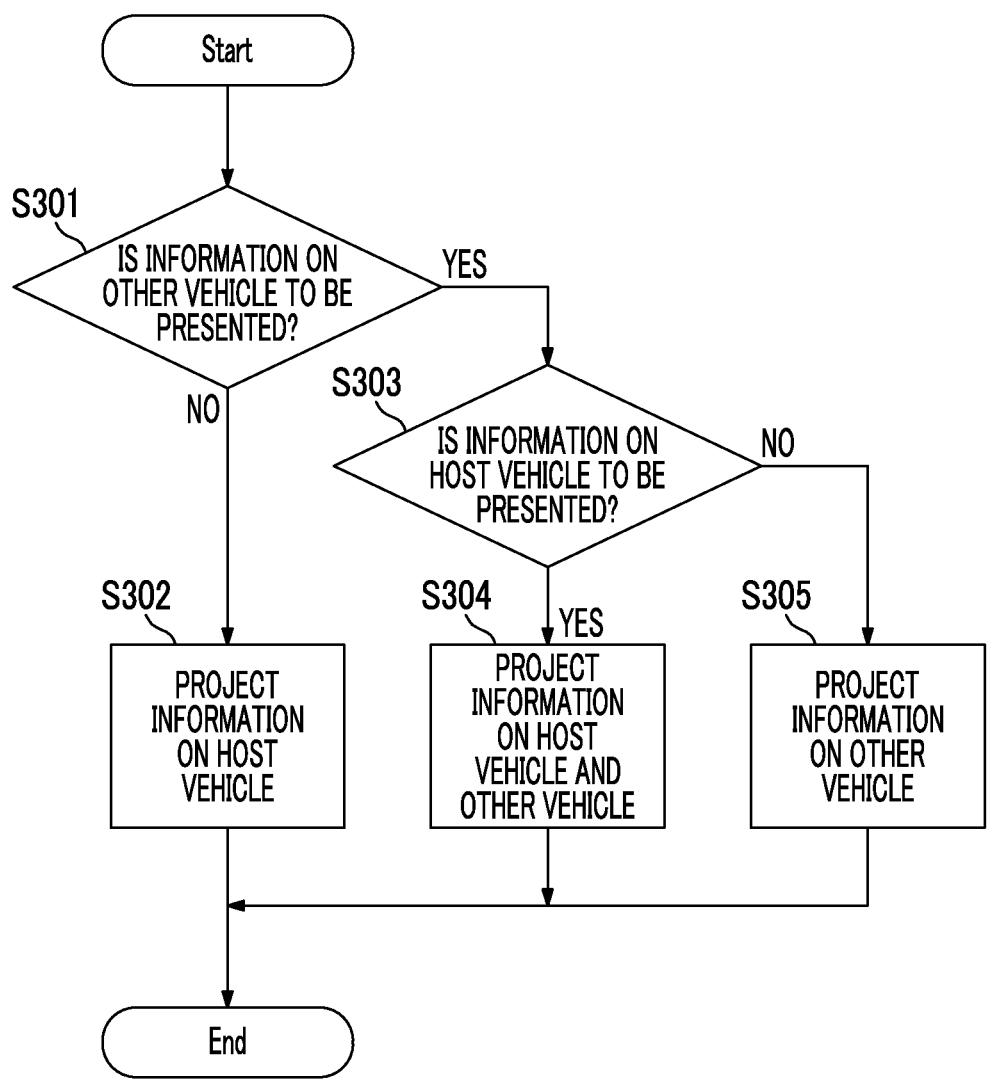
FIG. 8 a flowchart showing the processing flow of first projection control.

In the following, the first projection control is described in detail with reference to FIG. 8. FIG. 8 is a flowchart showing the processing flow of the first projection control.

In FIG. 8, when the first projection control is started, it is first determined whether the information (presentation information) to be presented to the target using the projection pattern relates to the other vehicle 40 (step S301).

When it is determined that the presentation information does not relate to the other vehicle 40 (in other words, the presentation information relates to the host vehicle 20) (step S301: NO), the projection pattern 50 indicating the information on the host vehicle 20 is projected from the host vehicle 20 to the target (step S302). The projection pattern 50 projected from the host vehicle 20 in this case is a specific example of the "first pattern".

On the other hand, when it is determined that the presentation information relates to the other vehicle 40 (step S301: YES), then it is determined whether the presentation information relates to the other vehicle 40 as well as to the host vehicle 20 (step S303). More specifically, it is determined whether the presentation information relates to both the host vehicle 20 and the other vehicle 40 or only to the other vehicle 40.

When it is determined that the presentation information relates also to the host vehicle 20 (step S303: YES), the projection pattern 50, which indicates the information on the host vehicle 20 and the other vehicle 40, is projected from the host vehicle 20 toward the target (step S304). That is, the host vehicle 20 presents not only the information on the host vehicle 20 but also the information on the other vehicle 40 to the target. The projection pattern 50 projected from the host vehicle 20 in this case is a specific example of the "fourth pattern".

Figure 9:
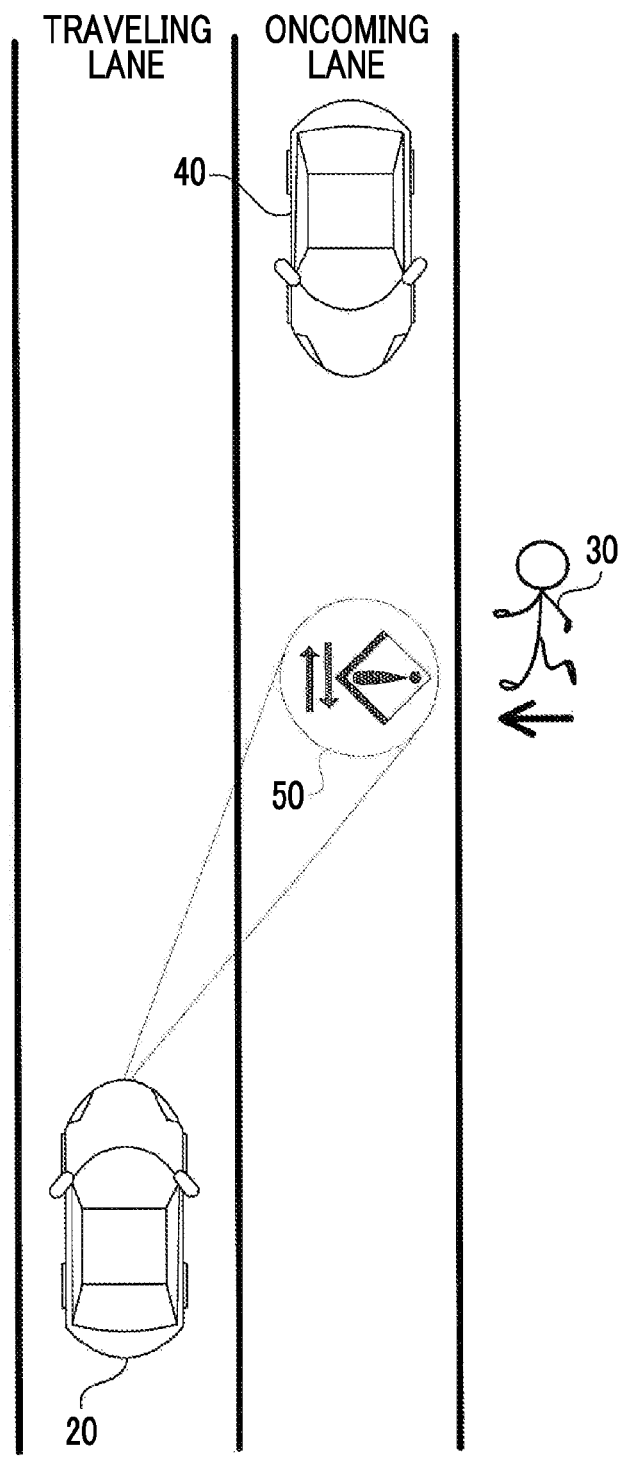
FIG. 9 is a top view showing an example in which information on the host vehicle and the other vehicle is projected.

The projection pattern 50 that indicates the information on the host vehicle 20 and the other vehicle 40 is described below in detail with reference to FIG. 9. FIG. 9 is a top view showing a projection example in which the information on the host vehicle and the other vehicle is projected.

As shown in FIG. 9, the projection pattern 50, which indicates the information on the host vehicle 20 and the other vehicle 40, includes the two "arrows" in addition to the "exclamation mark". These two arrows indicate the direction from which the host vehicle 20 is approaching and the direction from which the other vehicle 40 is approaching, respectively. Therefore, the pedestrian 30, who sees the projection pattern 50 like this, is expected to pay attention to the directions indicated by the two arrows (that is, both directions, left and the right, from the pedestrian 30).

Returning to FIG. 8, when it is determined that the presentation information does not relate to the host vehicle 20 (in other words, the presentation information relates only to the other vehicle 40) (step S303: NO), the projection pattern 50 that indicates the information on the other vehicle 40 is projected from the host vehicle 20 toward the target (step S305). That is, instead of the information on the host vehicle, the host vehicle 20 presents the information on the other vehicle 40 to the target. The projection pattern 50 projected from the host vehicle 20 in this case is a specific example of the "second pattern".

In the projection in step S304 and step S305 described above, the host vehicle 20 presents the information on the other vehicle 40 even when the other vehicle 40 does not present the information on itself. Therefore, an appropriate alert can be sent to the target, for example, even when the other vehicle 40 does not have a system similar to the vehicle lighting system 10.

The projection pattern 50 projected during the first projection control is projected when the other vehicle 40 is not projecting the projection pattern 50. That is, only one projection pattern is projected. For this reason, the projection pattern 50 projected from the host vehicle 20 during the first projection control only needs to be projected at a position where the target can visually recognize the pattern. There is no need to consider the positional relation with another projection pattern as in the case of the second projection control that will be described later.

Returning to FIG. 7, when it is determined that the other vehicle 40 is projecting the projection pattern (step S204: YES), the priority of the information to be presented by the host vehicle 20 and the priority of the information to be presented by the other vehicle 40 are compared (step S205). The "priority" mentioned here is the parameter for determining to which information, the information to be presented by the host vehicle 20 or the information to be presented by the other vehicle 40, the priority is to be given. For example, this parameter is set in advance according to the importance that is determined according to the type of information (more specifically, according to which information is linked to more directly danger). The unit that determines the priority of the information to be presented by the host vehicle 20 and the priority of the information to be presented by the other vehicle 40 is a specific example of the "third determination unit (third determination means)". Further, the ECU 200 may include the unit as logical or physical processing blocks.

In addition, the priority may be the parameter that varies depending not only upon the type of information but also upon the situation. More specifically, for the information to be presented to the pedestrian 30 closer to the other vehicle 40 rather than to the host vehicle 20, it is only required that the priority of the information to be presented from the other vehicle 40 be set higher than the priority of the information to be presented from the host vehicle 20. Conversely, for the information to be presented to the pedestrian 30 closer to the host vehicle 20 rather than to the other vehicle 40, it is only required that the priority of the information to be presented from the host vehicle 20 be set higher than the priority of the information to be presented from the other vehicle 40.

When it is determined as a result of the priority comparison that the priority of the information to be presented by the host vehicle 20 is higher than the priority of the information to be presented by the other vehicle 40 (step S206: YES), a projection stop request is output from the host vehicle 20 to the other vehicle 40. More specifically, a request for stopping the projection of the projection pattern 50 is output to the other vehicle 40 using vehicle-vehicle communication carried out by the communication device 130.

After outputting the projection stop request, it is determined whether the other vehicle 40 has actually stopped the projection of the projection pattern 50. This determination is made by carrying out vehicle-vehicle communication using the communication device 130 or by analyzing the image of data captured by the in-vehicle camera 110. When the other vehicle 40 has stopped the projection of the projection pattern 50 (step S208: YES), the first projection control described above is performed (step S210). That is, the projection control is performed on the premise that the other vehicle 40 is not projecting the projection pattern.

When the projection stop request is output but the projection from the other vehicle 40 is not stopped (step S208: NO), the projection stop request is output to the other vehicle 40 repeatedly (step S207). However, because there is a possibility that the other vehicle 40 does not have a unit for receiving the projection stop request, the output of the projection stop request may be stopped after the request is output the number of times equal to or more than the predetermined number of times. In this case, the second projection control (step S211), which will be described below, may be performed as an exceptional operation.

On the other hand, when it is determined as a result of priority comparison that the priority of the information to be presented by the host vehicle 20 is equal to or lower than the priority of the information to be presented by the other vehicle 40 (step S206: NO), the projection determination unit 240 performs the second projection control (step S211). The second projection control is a control operation that is performed when the other vehicle 40 is already projecting the projection pattern 50 (in other words, a control operation performed when both the host vehicle 20 and the other vehicle 40 project the projection pattern 50).

Figure 10:
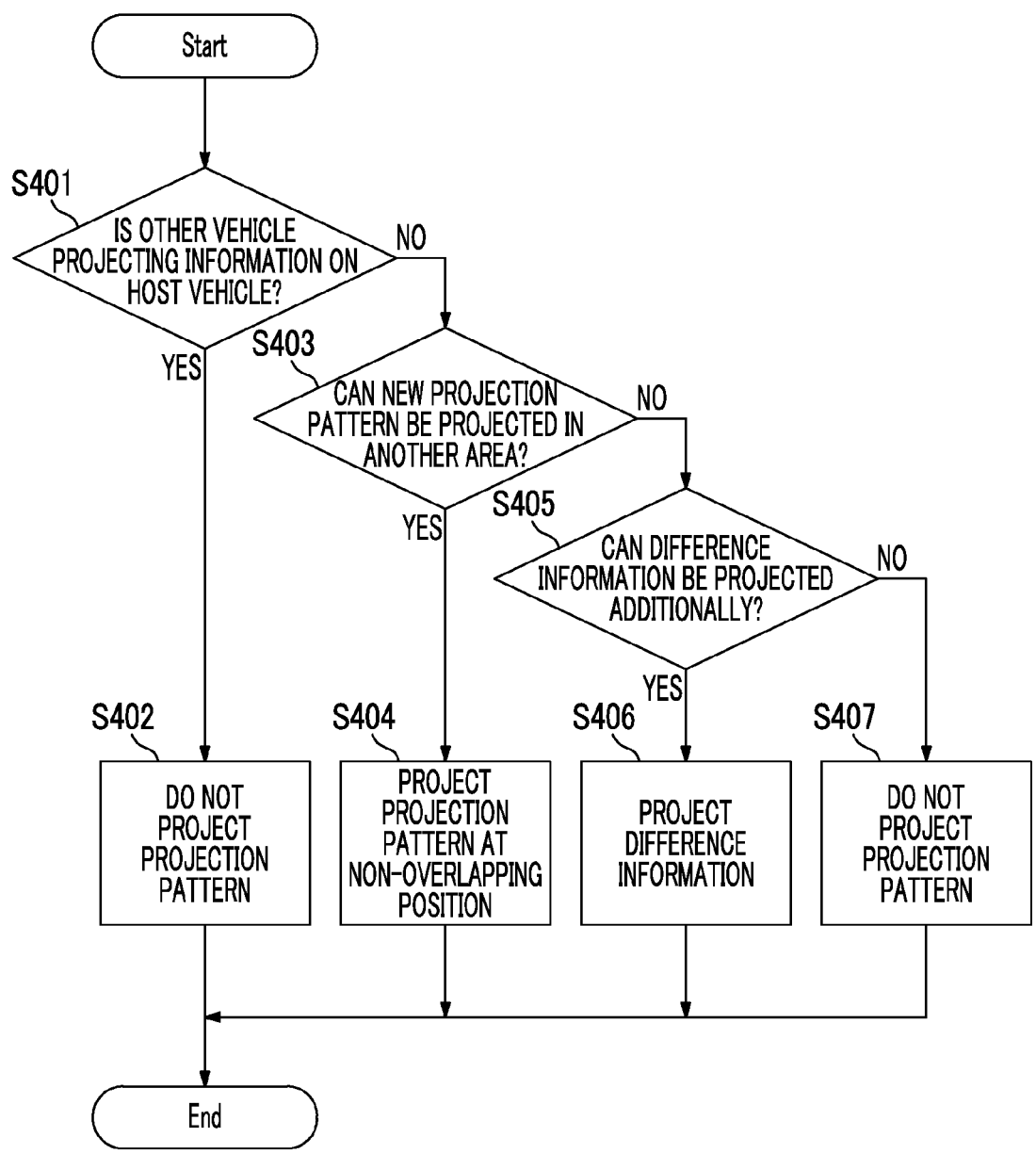
FIG. 10 a flowchart showing the processing flow of second projection control.

The second projection control is described in detail below with reference to FIG. 10. FIG. 10 is a flowchart showing the processing flow of the second projection control.

In FIG. 10, when the second projection control is started, it is determined whether the other vehicle 40 is presenting the information on the host vehicle 20 (that is, whether the information indicated by the projection pattern 50, projected by the other vehicle 40, includes the information on the host vehicle 20) (step S401).

When it is determined that the other vehicle 40 is presenting the information on the host vehicle 20 (step S401: YES), the host vehicle 20 does not project the projection pattern 50 toward the target (step S402). This is because there is no need to newly present the information on the host vehicle 20 since it is already included in the projection pattern 50 projected from the other vehicle 40. However, when the information on the host vehicle 20 is insufficient, the host vehicle 20 may project the projection pattern 50 that compensates for the insufficient information.

On the other hand, when it is determined that the other vehicle 40 is not presenting the information on the host vehicle 20 (step S401: NO), then it is determined whether a new projection pattern 50 can be projected in an area other than the area in which the other vehicle 40 is currently projecting the projection pattern 50 (step S403). More specifically, based on the surrounding environment information acquired by the information acquisition unit 210, it is determined whether there is an area, large enough to project the new projection pattern 50, within the visible range of the target.

When it is determined that the projection pattern 50 can be projected in the other area (step S403: YES), the host vehicle 20 projects the projection pattern at a non-overlapping position where the projection pattern 50 does not overlap with the projection pattern 50 already projected by the other vehicle 40 (step S404). The "non-overlapping position" mentioned here means not only a position where the projection pattern 50, projected by the other vehicle 40, and the projection pattern 50, projected by the host vehicle 20, do not overlap at all but also a position where the overlapping portion, if any, is so small that there is little or no loss in what is meant by the projection pattern 50. The "non-overlapping position" is assumed to be in a predetermined range around the target and is an area visible from the target.

Figure 11:
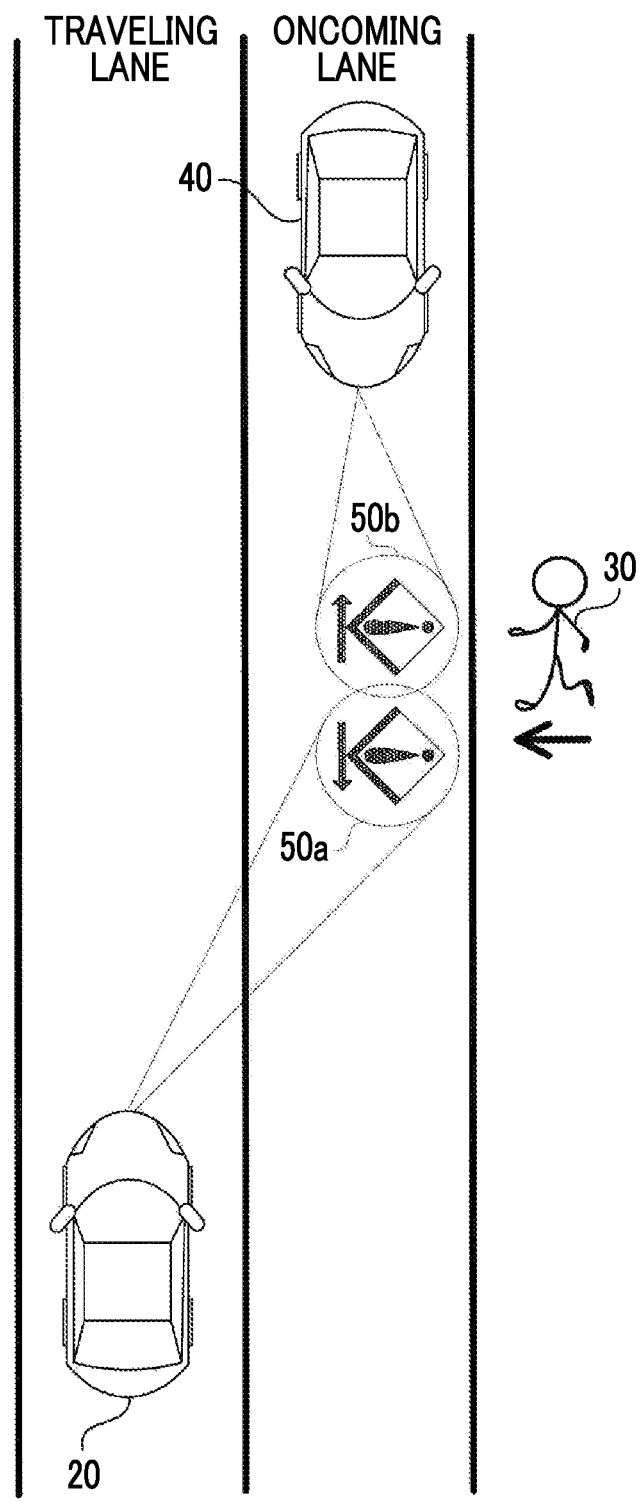
FIG. 11 is a top view showing an example in which a projection pattern is projected at a position not overlapping with the position of a projection pattern from the other vehicle.

Projection at a non-overlapping position, where the projection pattern 50 from the host vehicle 20 do not overlap with the projection pattern 50 from the other vehicle 40, is described more in detail below with reference to FIG. 11. FIG. 11 is a top view showing an example in which the projection pattern is projected at a position not overlapping with the position of the projection pattern from the other vehicle.

It is assumed that, as shown in FIG. 11, the other vehicle 40 is projecting the projection pattern 50b (more specifically, the pattern including the "exclamation mark" and the "right arrow (viewed from the pedestrian)") to inform the pedestrian 30 that the other vehicle 40 is approaching. In such a case, the host vehicle 20 projects the projection pattern 50a (more specifically, the pattern including the "exclamation mark" and the "left arrow (viewed from the pedestrian))", next to the projection pattern 50b projected by the other vehicle, to inform the pedestrian 30 that the host vehicle is approaching. The pedestrian 30 who views the projection pattern 50a and the projection pattern 50b is expected to pay attention to both the right direction and the left direction.

The above-described projection mode is exemplary only, and the position of the projection pattern 50a, projected by the host vehicle 20, need not necessarily be next to the projection pattern 50b projected by the other vehicle 40. It is only required that the position of the projection pattern 50a be a position where the projection pattern 50a is visible from the pedestrian 30 and, in addition, the projection pattern 50a does not overlap with the projection pattern 50b projected by the other vehicle 40. However, to give an appropriate alert to the pedestrian 30, it is preferable that the position of the projection pattern 50a projected by the host vehicle 20 be a position near from the projection pattern 50b projected by the other vehicle 40.

Returning to FIG. 10, when it is determined that the projection pattern 50 cannot be projected in another area (step S403: NO), then it is determined whether the difference information can be projected additionally in the surrounding area of the projection pattern 50 projected by the other vehicle 40 (step S405). When it is determined that the difference information can be projected additionally (step S405: YES), the host vehicle 20 projects the projection pattern 50 that indicates the difference information (step S406).

The "difference information" mentioned here refers to the difference between the information to be presented to the target by the host vehicle 20 and the information indicated by the projection pattern 50 projected by the other vehicle 40. The difference information is calculated by the projection determination unit 240. More specifically, the difference information can be calculated by removing the overlapping information, which overlaps with the information indicated by the projection pattern 50 projected by the other vehicle 40, from the information to be presented from the host vehicle 20. In this case, the information indicated by the projection pattern 50 projected by the other vehicle 40 may be acquired by vehicle-vehicle communication carried out by the communication device 130 or by analyzing the data captured by the in-vehicle camera 110.

The amount of the difference information is smaller than the amount of the information to be presented to the target by the host vehicle 20. Therefore, the projection pattern 50 indicating the difference information can be simplified and reduced in size as compared with the independent projection pattern 50 (for example, see FIG. 11). This means that, even if the independent projection pattern 50 cannot be projected separately due to a shortage in the projection area, there is a possibility that the projection pattern 50 showing the difference information can be projected. In step S405 described above, it is determined whether the area, where the projection pattern will be projected, is not large enough to project the independent projection pattern 50 but is large enough to project the projection pattern 50 indicating the difference information.

Figure 12:
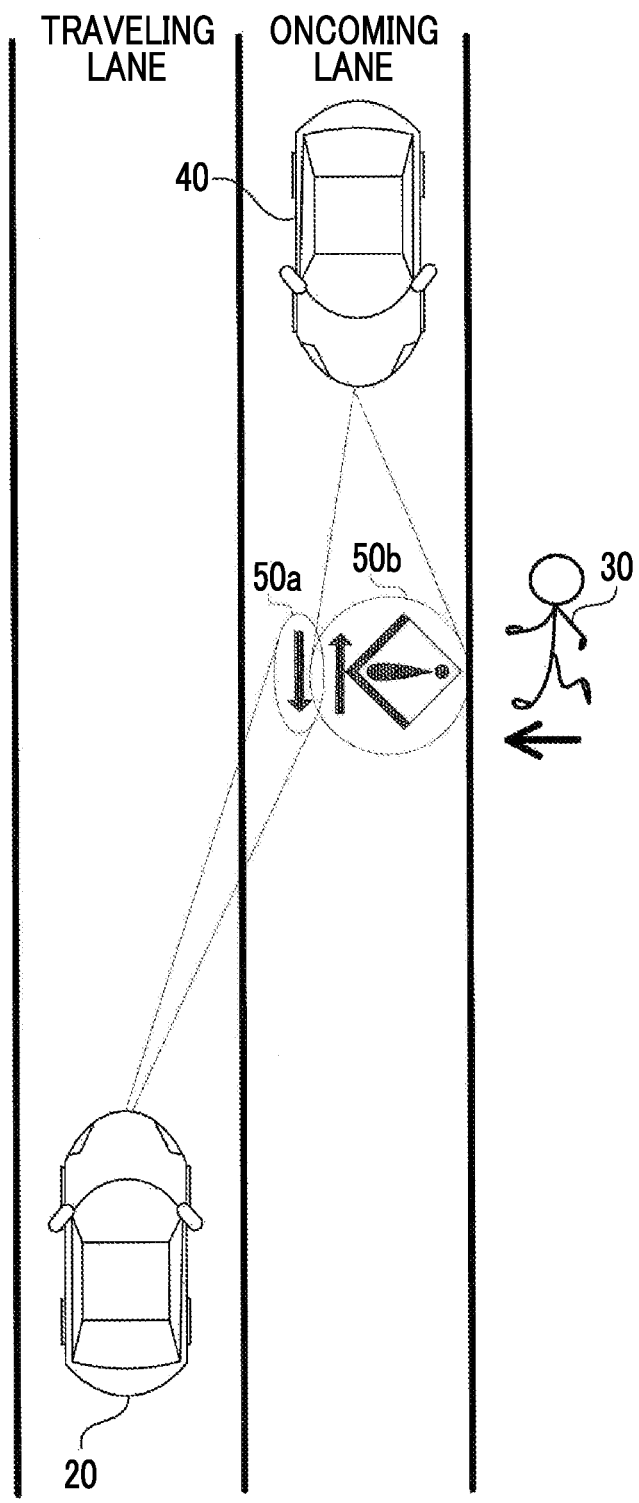
FIG. 12 is a top view showing an example in which the difference information indicating the difference from the projection pattern of the other vehicle is projected.

The projection of the difference information is described in detail below with reference to FIG. 12. FIG. 12 is a top view showing an example of projection in which the difference information indicating the difference from the projection pattern of the other vehicle is projected.

It is assumed, as shown in FIG. 12, that the other vehicle 40 is projecting the projection pattern 50b (more specifically, the pattern including the "exclamation mark" and the "right arrow (viewed from pedestrian)") to inform the pedestrian 30 that the other vehicle 40 is approaching. In such a case, the host vehicle 20 projects the projection pattern 50a (more specifically, the pattern including the "left arrow (viewed from pedestrian)") in the area immediately above the projection pattern 50b, projected by the other vehicle, to inform the pedestrian 30 that the host vehicle 20 is approaching. The pedestrian 30 who views the projection pattern 50a and the projection pattern 50b is expected to pay attention to both the right direction and the left direction. The projection pattern 50a mentioned here is a specific example of the "third pattern".

In the situation described above, the information to be originally presented from the host vehicle 20 to the pedestrian 30 is the information indicating an alert to the pedestrian 30 (corresponding to the exclamation mark) and the information indicating the direction from which the host vehicle 20 is approaching (corresponding to the arrow) (for example, see FIG. 11). However, the information indicating an alert to the pedestrian 30 (corresponding to the exclamation mark) is already included in the projection pattern 50b projected from the other vehicle 40 and there is no need to project the same information redundantly. Therefore, even when only the projection pattern 50a, which includes only the arrow indicating the direction from which the host vehicle 20 is approaching, is projected, it is possible to present the information equivalent to the information indicated by the independent projection pattern 50 that is projected separately.

Returning to FIG. 10 again, when it is determined that the difference information cannot be projected additionally (step S405: NO), the host vehicle 20 does not project the projection pattern 50 (step S407). Doing so prevents the information, indicated by the projection pattern 50b projected by the other vehicle 40, from being blocked by the projection pattern 50a to be projected by the host vehicle 20.

The technical effects achieved by the vehicle lighting system 10 in the second embodiment is described below. As described with reference to FIG. 7 to FIG. 12, when there is a target around the host vehicle 20 (i.e., the pedestrian 30) to which an alert should be sent, the vehicle lighting system 10 in the second embodiment determines whether the host vehicle 20 will project the projection pattern 50, or in which the host vehicle 20 will project the projection pattern 50, according to various conditions.

More specifically, according to the priority of the information indicated by the projection patterns 50 projected by the host vehicle 20 and the other vehicle 40 and according to the contents of the information indicated by the projection pattern projected by the other vehicle 40, the contents of the information to be presented by the projection pattern 50, projected by the host vehicle 20, and the projection position of the projection pattern 50 are changed, respectively, to the appropriate contents and the appropriate projection position. Thus, an alert can be given more appropriately in this embodiment than in the first embodiment in which the host vehicle 20 does not project the projection pattern 50 when the other vehicle 40 is already projecting the projection pattern 50.

Although the examples have been described in which the target, to which an alert should be sent, is the pedestrian 30 in the first embodiment and the second embodiment described above, the target is not limited to the pedestrian 30. For example, when there is a third vehicle to which an alert should be sent from the host vehicle 20 and the other vehicle 40, the third vehicle may be the target.

It is to be understood that the present disclosure is not limited to the embodiments described above but may be changed as appropriate within the scope of claims and within the spirit and the concept of the present disclosure understood from this specification and that a vehicle lighting system, to which such changes are added, is also included in the technical scope of the present disclosure.

What is claimed is:

1. A vehicle lighting system comprising:
   a first detection unit configured to detect a moving body around a host vehicle;
   a first determination unit configured to determine whether the moving body is a target to which an alert should be sent;
   a projection unit configured to project a first pattern on a road surface in a predetermined range around the target so as to caution the target when the first determination unit determines that the moving body is the target, the first pattern indicating first information on the host vehicle;
   a second determination unit configured to determine whether another vehicle is projecting a second pattern in the predetermined range around the target, the second pattern indicating second information on the other vehicle; and
   a control unit configured to control the projection unit such that the first pattern is projected at a position where the predetermined range around the target and the first pattern does not overlap with the second pattern or such that the first pattern is not projected, when the second determination unit determines that the other vehicle is projecting the second pattern.

2. The vehicle lighting system according to claim 1, wherein
   the control unit is configured to control the projection unit such that the first pattern is projected at the predetermined range around the target when the second determination unit determines that the other vehicle is not projecting the second pattern.

3. The vehicle lighting system according to claim 1, further comprising,
   a difference calculation unit configured to calculate difference information that is included in the first information but is not included in the second information, wherein
   the projection unit is configured to project a third pattern in addition to the first pattern, the third pattern indicating the difference information, and
   the control unit is configured to control the projection unit such that, instead of the first pattern, the third pattern is projected at the predetermined range around the target and the third pattern does not overlap with the second pattern, when the second determination unit determines that the other vehicle is projecting the second pattern.

4. The vehicle lighting system according to claim 1, further comprising,
   a third determination unit that determines priority of the first information and the second information, each of the first information and the second information having information indicating the priority, wherein
   the control unit is configured to control the projection unit such that a request is sent to the other vehicle to stop the projection of the second pattern and, after that, the first pattern is projected, when the second determination unit determines that the other vehicle is projecting the second pattern and that the third determination unit determines that the priority of the first information is higher than the priority of the second information.

5. The vehicle lighting system according to claim 1, wherein
the projection unit is configured to project the second pattern and a fourth pattern in addition to the first pattern, the fourth pattern indicating both the first information and the second information, and
the control unit is configured to control the projection unit such that the second pattern or the fourth pattern is projected instead of the first pattern, when the second determination unit determines that the other vehicle is not projecting the second pattern.

6. The vehicle lighting system according to claim 1, wherein
the first determination unit is configured to determine whether the moving body is the target, based on contact possibility between the host vehicle and the moving body or peripheral visibility of the moving body.

7. The vehicle lighting system according to claim 6, wherein
the first determination unit is configured to determine whether the moving body is the target based on contact possibility between the other vehicle and the moving body or the peripheral visibility of the moving body.

8. The vehicle lighting system according to claim 1, wherein
the second determination unit is configured to determine whether the other vehicle is projecting the second pattern based on an analysis result of captured image data.

9. A vehicle lighting system comprising:
a projection unit configured to project a first pattern, the first pattern indicating first information on a host vehicle; and
an electronic control unit configured to:
detect a moving body around the host vehicle,
determine whether the moving body is a target to which an alert should be sent,
project, by the projection unit, the first pattern on a road surface in a predetermined range around the target so as to caution the target when it is determined that the moving body is the target,
determine whether another vehicle is projecting a second pattern in a predetermined range around the target, the second pattern indicating second information on the other vehicle; and
control the projection unit such that the first pattern is projected at a position where the predetermined range around the target and the first pattern does not overlap with the second pattern or such that the first pattern is not projected, when it is determined that the other vehicle is projecting the second pattern.

* * * * *